United States Patent
Jaiser et al.

(10) Patent No.: US 11,707,877 B2
(45) Date of Patent: Jul. 25, 2023

(54) METHOD FOR THE PRODUCTION OF FILLED CONTAINERS FROM THERMALLY CONDITIONED PREFORMS

(71) Applicant: KHS GmbH, Dortmund (DE)

(72) Inventors: Benjamin Jaiser, Hamburg (DE); Michael Linke, Hamburg (DE); Deniz Ulutürk, Hamburg (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/852,078

(22) Filed: Jun. 28, 2022

(65) Prior Publication Data

US 2022/0339850 A1    Oct. 27, 2022

Related U.S. Application Data

(62) Division of application No. 16/495,695, filed as application No. PCT/EP2018/082169 on Nov. 22, 2018, now abandoned.

(30) Foreign Application Priority Data

Nov. 30, 2017    (DE) ..................... 10 2017 011 087.5

(51) Int. Cl.
*B29C 49/64*    (2006.01)
*B29C 49/12*    (2006.01)
(Continued)

(52) U.S. Cl.
CPC .......... *B29C 49/6436* (2013.01); *B29C 49/12* (2013.01); *B29C 49/36* (2013.01);
(Continued)

(58) Field of Classification Search
CPC ..... B29C 49/6436; B29C 49/12; B29C 49/36; B29C 49/46; B29C 49/786;
(Continued)

(56) References Cited

U.S. PATENT DOCUMENTS 3,892,830 A    7/1975 Hudson et al.
4,076,071 A    2/1978 Rosenkranz et al.
(Continued)

FOREIGN PATENT DOCUMENTS

DE    2352926 A1    4/1975
DE    3314106 A1    10/1984
(Continued)

*Primary Examiner* — Galen H Hauth
*Assistant Examiner* — Shibin Liang
(74) *Attorney, Agent, or Firm* — Rankin, Hill & Clark LLP

(57) ABSTRACT

A method for producing containers filled with liquid content from preforms made of thermoplastic material. The liquid content is fed as a pressure medium into thermally conditioned preforms during a forming and filling phase in a mold of one of a plurality of forming stations arranged circumferentially spaced apart on a common, continuously rotationally driven working wheel. A compensating device compensates for thermal consequences of centrifugal force acting on the liquid content fed into the preform during the forming and filling phase. The compensating device imparts a temperature profile to the preform in a circumferential direction, which is not point-symmetrical in relation to a longitudinal axis of the preform to produce a thermally differentiated partial circumferential region. The preform is inserted into the mold such that the thermally differentiated partial circumferential region faces in a radial direction of the working wheel.

10 Claims, 7 Drawing Sheets

(51) Int. Cl.
*B29C 49/36* (2006.01)
*B29C 49/46* (2006.01)
*B29C 49/78* (2006.01)
*B29L 31/00* (2006.01)

(52) U.S. Cl.
CPC ............ *B29C 49/46* (2013.01); *B29C 49/786* (2013.01); *B29C 49/78* (2013.01); *B29C 2049/4664* (2013.01); *B29L 2031/7158* (2013.01)

(58) Field of Classification Search
CPC .. B29C 2049/4664; B29C 2949/78899; B29C 49/68; B29L 2031/7158; B65B 51/22; B65B 7/28; B29D 22/00
See application file for complete search history.

(56) References Cited

U.S. PATENT DOCUMENTS

| | | |
|---|---|---|
| 5,346,386 A | 9/1994 | Albrecht et al. |
| 5,648,026 A | 7/1997 | Weiss |
| 5,681,521 A * | 10/1997 | Emmer ............... B29C 49/6445 425/526 |
| 5,853,775 A | 12/1998 | Oas et al. |
| 6,287,507 B1 | 9/2001 | Appel et al. |
| 7,914,726 B2 | 3/2011 | Andison et al. |
| 2012/0266567 A1 | 10/2012 | Haesendonckx et al. |
| 2016/0059469 A1* | 3/2016 | Diesnis ................... B65B 7/285 264/524 |
| 2016/0318230 A1 | 11/2016 | Linke et al. |
| 2019/0091918 A1 | 3/2019 | Klatt et al. |

FOREIGN PATENT DOCUMENTS

| | | |
|---|---|---|
| DE | 4212583 A1 | 10/1993 |
| DE | 4340291 A1 | 6/1995 |
| DE | 69401024 T2 | 5/1997 |
| DE | 102007016027 A1 | 10/2008 |
| DE | 102010026166 A1 | 7/2010 |
| DE | 102010007541 A1 | 6/2011 |
| DE | 102016004405 A1 | 10/2017 |
| EP | 0620099 A1 | 10/1994 |
| EP | 2930005 A1 | 10/2015 |
| GB | 2138735 A | 10/1984 |
| WO | 9732713 A1 | 9/1997 |
| WO | 2016180510 A1 | 11/2016 |

* cited by examiner

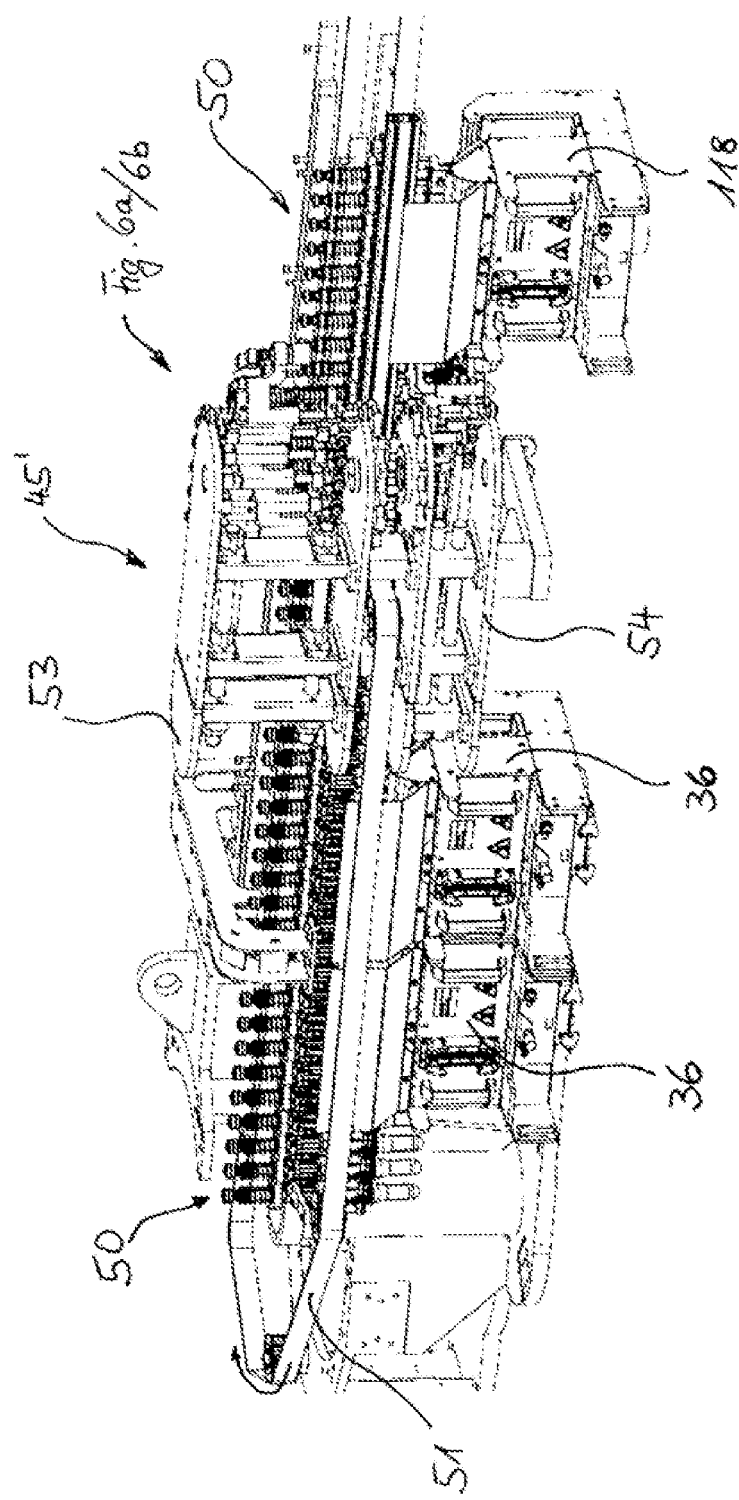

METHOD FOR THE PRODUCTION OF FILLED CONTAINERS FROM THERMALLY CONDITIONED PREFORMS

CROSS-REFERENCE TO RELATED APPLICATIONS

This application is a division of U.S. patent application Ser. No. 16/495,695, filed Sep. 19, 2019, which is a U.S. National Stage of International Pat. App. Ser. No. PCT/EP2018/082169, filed Nov. 22, 2018, and claims priority to German Pat. App. Ser. No. DE 10 2017 011 087.5, filed Nov. 30, 2017.

BACKGROUND OF INVENTION

Field of Invention

The invention relates to a method for producing containers filled with a liquid content from thermally conditioned preforms made from a thermoplastic material, and a device for producing containers filled with a liquid content from temperature-conditioned preforms made of a thermoplastic material.

Brief Description of Related Art

The production of containers by means of blow molding from preforms made of a thermoplastic material, for example from preforms made of PET (polyethylene terephthalate), is known, wherein the preforms are supplied to different processing stations within a blow molding machine. Typically, a blow molding machine has a heating device for temperature control and/or thermal conditioning of the preforms as well as a blowing device with at least one blowing station, in which area the previously temperature-conditioned preform is expanded into a container. The expansion takes place with the help of a compressed gas (pressurized air) as a pressure medium, which is introduced into the preform to be expanded with a forming pressure. The process-engineering sequence with such an expansion of the preform is explained in DE 43 40 291 A1. The basic structure of a blowing station is described in DE 42 12 583 A1. Possibilities of thermal conditioning of the preforms are explained in DE 23 52 926 A1. Thermal conditioning here is understood to mean that the preform is heated to a temperature suitable for blow molding and optionally a temperature profile is imparted to the preform in the longitudinal direction and/or in the circumferential direction. The blow molding of containers made from preforms with the additional use of a stretching rod is likewise known.

According to a typical further processing method, the containers produced by means of blow molding are fed to a downstream filling device and filled with the intended product or content here. Thus, a separate blow molding machine and a separate filling machine are used. In doing so, it is also known to combine the separate blow molding machine and the separate filling machine into a machine block, i.e. into a combined blow-molding filling device, wherein still the blow molding and the filling take place on separate machine components and one after the other.

Furthermore, it has already been proposed to produce containers, particularly also in the form of bottles, from thermally conditioned preforms and, in doing so, to simultaneously fill with a liquid content, which is supplied as a hydraulic pressure medium to expand the preform and/or to form the container with a forming and filling pressure such that the respective preform is formed into the container at the same time as the filling. Such methods in which simultaneous forming and filling of the respective container takes place can also be characterized as a hydraulic forming process or as hydraulic container forming. It is also known here to support this forming by the use of a stretching rod. In this case as well, the preform is initially temperature-conditioned before the forming and filling process, i.e. is heated to a temperature suitable for the hydraulic forming and optionally imparted with a temperature profile.

When forming the container from the preforms by means of the content to be filled itself, i.e. with the use of the content as a hydraulic pressure medium, only one machine is required for the forming and filling of the container, said machine, however, having increased complexity for this. An example of such a machine is shown in U.S. Pat. No. 7,914,726 B2. DE 10 2010 007 541 A1 shows a further example.

The simultaneous forming and filling of a container from a preform takes place in a forming station, which has, inter alia, a multipart mold. The multipart structure of the mold is required in order to insert a preform into the mold and to remove the completely formed and filled container from the mold after completion of the forming and filling process. The multipart mold in this case is arranged in the forming station and designed such that the mold can have a closed state and an open state. In the closed state, the multipart mold encloses an inner cavity and, in the closed state, the multipart mold forms an inner wall of the mold, against which the preform expands in the closed state by supplying the liquid content into the preform at a pressure and into the container bubble resulting from the preform until the final container form is obtained, wherein this forming process is preferably supported, at least for a time, by a stretching rod, in which said stretching rod is inserted into the preform against the closed base of the preform. The stretching rod has the task of stretching the preform in the axial direction and guiding the expansion thereof, at least for a time. Furthermore, it is customary for the forming stations to be cyclically or periodically fed a preform, and completely formed containers are removed from the mold cyclically or periodically. Also known, for example, are cyclically working machines with multiple forming stations or also machines functioning according to the rotation principle with continuously circulating working wheels on which multiple forming stations are arranged circumferentially spaced apart and at a radial distance from an axis of rotation of the working wheel. The invention relates to these machines of the rotational type.

Compared to the production process and compared to the devices with the blow molding of preforms into containers while using a pressurized gas, there are particularities and problems which have not yet been solved in a fully satisfactory manner with the forming of preforms into containers with simultaneous filling by means of the use of a filling material as a liquid pressure medium. The present invention relates to such a particularity and such a problem which occurs with machines functioning according to the rotation principle.

Centrifugal forces due to the introduction of a gas as a pressure medium during container forming have not played any significant role until now; thus, the centrifugal force is significantly more strongly pronounced during the production of the container due to the introduction of a pressurized liquid, because the introduced liquid has a much greater mass than a pressurized gas and is thus pressed outward with more force. On one hand, this has the consequence that the wall area of the preform, which is lying radially outward, and/or the developing container bubble is cooled more strongly by the filled content. On the other hand, it has been determined that the preform will make contact radially outward on the inner wall of the mold earlier. However, this effect is partially reduced by means of the use of a stretching rod. Nevertheless, the centrifugal force leads to the aforementioned effect that a certain area of the developing container bubble, namely the area lying radially outward, makes contact with the inner wall of the mold earlier than an area lying radially inward and thereby, e.g., cools off earlier when the inner wall of the mold is colder than the preform and/or the container bubble, which is regularly the case, provided there are not hot-fill-forming and filling processes present in which the mold, e.g., is maintained at an increased temperature, which may be close to the forming temperature of the preform. The disadvantage here is that the temperature in the preform and/or in the developing container bubble has significant influence on the material distribution in the finished container. In this respect, the aforementioned cooling effects lead to a deviation in the material distribution in the finished container from the targeted material distribution.

There have been no solutions to this problem in the prior art up until now and the prior art also has not previously described this problem, because this problem is specifically for the simultaneously implemented forming and filling process of containers from preforms.

Thus, the object of the present invention is to provide a method and a device for the production of filled containers from temperature-conditioned preforms, which solve the previously mentioned problem with high forming and filling rates in addition.

BRIEF SUMMARY OF THE INVENTION

This object is achieved by means of a method as disclosed herein. Accordingly, it is provided that the thermal consequences of the centrifugal force are compensated for by a compensating device. Said compensating device should be designed as a temperature control device in order to impart a compensating temperature profile to the preform, wherein said temperature profile is designed in its symmetry and in its size to compensate for the previously described thermal consequences of the rotational movement of the containers and of the forming fluid filled therein. These thermal consequences are primarily the previously explained early contact of the wall area, lying outward radially, of the preform with the inner wall of the mold. According to the invention, the compensating device in the form of the temperature control device is designed to impart a temperature profile to the preform in the circumferential direction thereof, which is not point-symmetrical in relation to the longitudinal axis of the preform, wherein this symmetrical observation naturally relates to a section perpendicular to said longitudinal axis of the preform; thus, the temperature distribution is considered in the circumferential direction in this sectional plane and thus generates a thermally differentiated partial circumferential region in the preform. The preform is then inserted into the mold at such an alignment that the thermally differentiated partial circumferential region is facing in the radial direction of the rotating circumferential working wheel. To this end, a suitable temperature profile to be imparted can be, e.g., empirically determined by means of a few tests, e.g. in which the material distribution, e.g. measured by means of wall thicknesses, is determined in the circumferential direction of the container with container production without compensation and with the specified compensating temperature profiles. It is also possible to adjust and/or readjust the compensating temperature profile by means of a control and/or regulation and by measuring wall thicknesses in ongoing operation.

This object is also achieved by means of a device with the features disclosed herein. Subsequently, a compensating device is provided in the device, which, as previously explained, supports the compensation of the thermal consequences and which has a temperature control device. In doing so, the temperature control device is designed and configured using control engineering for production of the aforementioned compensating temperature profile in the preform, and the compensating device furthermore has a preform alignment device for the aligned insertion of the temperature-profiled preform in a mold of a forming station. The temperature control device in this case is designed and configured to impart a temperature profile to the preform, which is not point-symmetrical in relation to the longitudinal axis of the preform, in order to create a thermally differentiated partial circumferential region in the preform. The symmetrical observation relates to a section perpendicular to the longitudinal axis of the preform; thus, the temperature distribution is considered in the circumferential direction in this sectional plane. The preform alignment device is, in turn, designed and configured to insert the preform into the mold with such an alignment that the thermally differentiated partial circumferential region is facing in the radial direction. The explanations given in the previous paragraph apply to the method herein accordingly.

The goal of the previously described device as well as the previously described method in this case is to offset the early and asymmetrical contact of a partial circumferential region of the container bubble with the thermal effect occurring at the inner wall of the mold due to a preceding corresponding and compensating thermal differentiation of a partial circumferential region of the preform.

Advantageous embodiments and details of this general technical teaching according to the invention are indicated in the dependent claims or result from the description of the figures.

It should be noted that the described and claimed compensating thermal differentiation of the preforms is a supplement to the known temperature conditioning; optionally, the known preferential heating is also a supplement to this.

This results in various options for implementing the thermal differentiation of a partial circumferential region of a preform according to the invention. Thus, it is essentially possible, e.g., to choose between a targeted cooling or a targeted heating of the thermally differentiated partial circumferential region. It is essentially also possible to achieve the thermal differentiation of a partial circumferential region in that the complementary regions thereto are cooled or heated in a targeted manner. It is also possible to purposefully cool a partial circumferential region and to purposefully heat another region in order to achieve the thermal differentiation of a partial circumferential region according to the invention. Suitable heating mechanisms for the targeted heating as well as suitable cooling devices for the targeted cooling are known in the prior art, e.g., from the technical area of temperature conditioning of preforms. Known heating and/or cooling devices used for this purpose can also be used for the described thermal differentiation according to the invention. For example, radiant heaters emitting thermal radiation in the IR or NIR range or cool-air or hot-air blowers are suitable.

The previously described thermal consequences of the centrifugal force depend on whether the preform and/or the container bubble developing therefrom or whether the inner wall of the mold is at a higher temperature. If the inner wall of the mold is, e.g., colder than the preform and/or the container bubble, the thermal consequences would be an earlier and stronger cooling of the container bubble in its region lying outward radially and initially making contact with the inner wall of the mold. On the other hand, if the inner wall of the mold is maintained at a higher temperature than the container bubble, the thermal consequences would be a heating of the container bubble in said region lying outward radially. The cooling or heating occurring due to the asymmetrical contact of the container bubble with the inner wall of the mold would be offset by means of the suitable prior heating or cooling measures on the preform. Compensation of cooling of the container bubble in its region lying outward radially could exist, e.g., from a targeted heating of the preform in this region or from a targeted cooling of the remaining regions. It is also possible to provide said targeted heating of a region and the targeted cooling of the remaining region simultaneously.

From the aforementioned possibilities, it is considered to be advantageous for the method as well as for the device that the thermally differentiated partial circumferential region is heated more strongly than the remaining circumferential regions of the preform. The targeted heating of a partial circumferential region is already known to one skilled in the art from the technical area of so-called "preferential heating," however, not in the symmetry according to the claim, and one skilled in the art can thus resort to the known technology and known heating mechanisms. Furthermore, the targeted heating is possible, e.g., by supplying heating capacity by means of IR or NIR radiation. In doing so, this refers to the absorption of radiation which occurs over the entire thickness of the wall and thus throughout the entire wall volume. A quicker and more direct input of thermal energy is advantageous, e.g., as compared to blowing with a cooling medium, whereby initially only the surface being blown at would be cooled, and the cooling throughout the volume would then take place by means of slower thermal processes.

In particular, it is advantageous in this case when the thermally differentiated partial circumferential region is facing radially outward after insertion of the preform into the mold of a forming station. The compensating temperature profile is thereby simpler to adjust and to determine, because there is a direct geometric association between the thermally differentiated region and the region initially making contact with the inner wall of the mold. The area initially making contact with the inner wall of the mold would also thereby be the thermally differentiated region.

The thermal consequences of the centrifugal force are dependent on the circumferential speed of the working wheel. For this reason, it is advantageous both for the device and for the method when the compensation of the thermal consequences is implemented dependent on the circumferential speed in that the temperature profile imparted to the preform by the compensating device is selected or regulated and/or controlled as a function of the circumferential speed of the working wheel.

It would also be possible to arrange the imparting of the compensating temperature profile explained in the previous paragraphs to the preforms, e.g., between the heating device and the forming station or between the infeed region into the forming and filling machine and the heating device, e.g. on a transfer wheel arranged in between. For example, the temperature control device according to the claim could be arranged there, e.g., for creating the compensating temperature profile. However, it is proposed with advantage that the imparting of the compensating temperature profile takes place in the heating zone by means of the heating device for the preforms. The temperature control device according to the invention would thus be arranged in the heating zone. During pass-through of the heating device, the preform would obtain both the temperature conditioning for the forming known in the prior art as well as the imparting of a temperature profile in the circumferential direction according to the invention for the compensation of the thermal consequences of the centrifugal force, namely the thermal differentiation of a circumferential region. The heating mechanisms used for temperature conditioning could thereby also optionally be used for creating the compensation temperature profile. To this end however, the control and/or the regulation of the known heating mechanisms must be modified or optionally the preform would have to be moved differently than previously known, e.g., during pass-through of the heating zone. The entire temperature profile of the preform upon exiting the heating zone would then basically be the superimposing of the known profile based on the common temperature conditioning (optionally with preferential heating) plus the temperature profile which is imparted to the preform for the purposes of the compensation.

The partial circumferential region initially making contact with the inner wall of the mold will have a partial circumferential angle $\phi$ of less than 180°. For this reason, it is preferable for the thermally differentiated partial circumferential region to also have a partial circumferential angle $\phi$ of less than 180°, preferably less than 120°, further preferably less than 90°.

The described compensation by means of targeted imparting of a temperature profile to the preform in its circumferential direction has a certain similarity to the known area of preferential heating, with this being understood as generally the nonuniform temperature control of preforms in the circumferential direction thereof. With preferential heating, such type of nonuniform temperature control with more strongly heated circumferential regions and with less strongly heated circumferential regions is applied when containers, the cross-section thereof deviating from a circular shape, are to be produced from the preforms. The deviation may exist, for example, in that the containers are to be produced with an oval cross-section or, for example, with a triangular or rectangular cross-section. The temperature profile imparted to the preform within the scope of the preferential heating in this case follows the symmetry of the container to be produced, is point-symmetrical with respect to the longitudinal axis of the preform in this case, and does not support the compensation of thermal effects according to the invention which are due to and specific for the hydraulic forming of preforms on machines of a rotating design by means of the introduction of a pressurized liquid forming fluid into a preform. All of the non-generic documents regarding the prior art addressed in the following relate to the blow-molding production of containers from preforms by means of the introduction of a pressurized gaseous forming fluid into a preform.

The blow-molding production of non-round containers is described, e.g., in U.S. Pat. No. 3,892,830. Point-symmetrical temperature conditioning by means of selective shading is indicated in DE 33 14 106 A1. EP 0 620 099 B1 and DE 694 01 024 T2, with similar content, disclose a combining of methods known from the prior art for temperature conditioning of preforms. Furthermore, it is known in the prior art to initially heat a preform in a first heating section of a heating device in the circumferential direction homogenously, that is uniformly, and subsequently to create the temperature profile desired for preferential heating in a second heating section in the circumferential direction. WO 97/32713 discloses such prior art with an incrementally functioning rotational drive for the preforms. U.S. Pat. No. 5,853,775 discloses two heating sections with a likewise incrementally circulating transport chain with a plurality of chain links, in the form of transport mandrels, bearing preforms. Homogenous heating of the preforms initially takes place in a first heating station and, in a second heating station opposite the first station, circumferentially profiled heating of the preforms takes place. In both heating stations, the preforms are rotated by means of a chain assigned to only the respective heating station. DE 10 2007 016 027 A1 teaches a device for preferential heating, in which a rotational movement of the preforms is created by an extruded profile, which interacts with a gear wheel of the transport means, which carries the preforms through the heating zone and which, together with other transport means, is connected to a circulating transport chain. The extruded profile circulates around the heating zone spaced apart from the transport chain and intermeshes with the gear wheel of the transport means. In doing so, the extruded profile is driven at a constant or varying circumferential speed.

A significant difference compared to the preferential heating known in the prior art in this case is that the temperature profile according to the invention compensating for the influence of centrifugal force in the circumferential direction of the preform is independent of the symmetry of the container to be produced. With preferential heating, the symmetry of the temperature profile imparted to the preform in the circumferential direction follows the symmetry of the bottle to be produced, while the compensating temperature profile according to the invention in the circumferential direction may deviate from the symmetry of the container to be produced and normally does deviate therefrom. The method according to the invention and the device according to the invention lead to a non-point-symmetrical circumferential temperature profile and thus to a thermal differentiation of a circumferential region of the preform. However, they can advantageously be used during the production of point-symmetrical containers, particularly in the production of containers with n-fold rotational symmetry where n={2, 3,4,6,8}, particularly during the production of circular-symmetrical containers.

BRIEF DESCRIPTION OF THE DRAWINGS

Additional advantages, features, and details of the invention result from the exemplary embodiments described in the following with reference to the schematic drawings. The following is shown:

FIG. 5 a side view of a further exemplary embodiment of the invention;

DETAILED DESCRIPTION OF THE INVENTION

Figure 1:
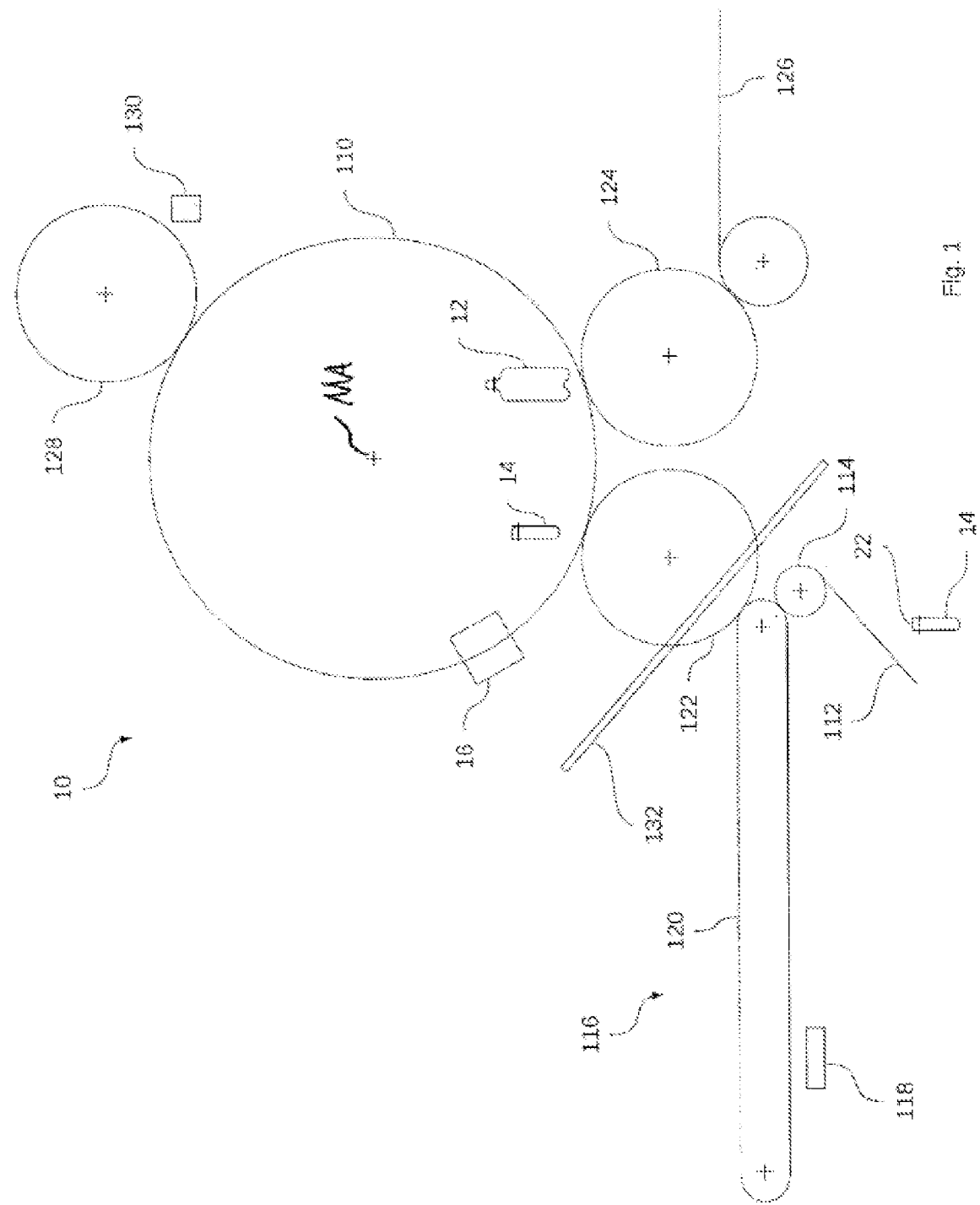
FIG. 1 a highly schematized representation of a forming and filling device.

The structure of a combined forming and filling machine 10 essentially known from the prior art is shown in FIG. 1. The representation shows the preferred design of such a filling device 10 in the form of a rotating machine with a rotating working wheel 110 supporting forming stations and/or forming and filling stations 16. Schematically represented preforms 14 are continuously fed to a heating device 116 by an infeed device 112 with use of a transfer wheel 114. In the region of the heating device 116, in which the preforms 14 are transported along a heating zone and thermally conditioned while doing so, the preforms 14 can be transported depending on the application, for example, with their outlet sections 22 upward in the vertical direction or downward in the vertical direction. The heating device 116 is equipped, for example, with heating mechanisms 118, which are arranged along a transport mechanism 120 for forming the heating zone. For example, a circulating chain with transport mandrels for retaining the preforms 14 can be used as a transport mechanism 120. For example, IR radiators or light-emitting diodes (LEDs) or NIR radiators are suitable as heating mechanisms 118. Because such heating mechanisms are known in various forms in the prior art and the design details of the heating mechanism are not essential for the present invention, a more detailed description can be omitted and reference can be made to the prior art, particularly to the prior art related to heating mechanisms of mold blowing and stretch mold blowing machines.

After sufficient temperature control, also known as thermal conditioning, the preforms 14 are transferred by a transfer wheel 122 to a working wheel 110, which is arranged so as to rotate, i.e. can be circumferentially driven about a vertical machine axis MA, and/or to forming and filling stations 16, which are arranged on the working wheel 110 distributed around the circumference. The working wheel 110 is equipped with a plurality of such forming and filling station 16, in the region of which both forming of the preforms 14 into the schematically shown containers 12 as well as filling of the containers 12 with the intended content take place. The forming of each container 12 in this case takes place simultaneously with the filling, wherein the content serves as a pressure medium during forming.

After the forming and filling, the containers 12 are taken from the working wheel 110 by a removal wheel 124, further transported, and supplied to an output zone 126. The working wheel 110 circulates continuously at a desired circumferential speed during production operation. During a revolution, the insertion of a preform 14 into a forming and filling station 16, the expansion of the preform 14 into a container 12 including filling with a content and optionally including stretching, in the event a stretching rod is provided, and the removal of the container 12 from the forming and filling station 16 take place.

According to the embodiment in FIG. 1, it is further optionally provided to feed schematically shown caps 130 to the working wheel 110 by means of an input mechanism 128. It is hereby also possible to implement a closing of the container 12 while already on the working wheel 110 and to handle completely formed, filled, and closed containers 12 using the removal device 124.

Various thermoplastic materials can be used as the material for the preforms 14. Examples include polyethylene terephthalate (PET), polyethylene (PE), polyethylene terephtalate (PEN), or polypropylene (PP). The dimensions as well as the weight of the preforms 14 are adapted to the size, the weight, and/or the shape of the containers 12 to be produced.

A plurality of electrical and electronic components are typically arranged in the region of the heating device 116. Moreover, the heating mechanisms 118 are provided with moisture-sensitive reflectors. Because a filling and forming of the container 12 takes place in the region of the working wheel 110 while using the liquid content, it should be ensured that unintentional entry of moisture is prevented in the region of the heating device 116 to prevent electrical problems. This can take place, for example, by means of a partition mechanism 132, which at least offers spray protection. Moreover, it is also possible to suitably adjust the temperature of the transport elements for the preforms 14, said transfer elements being used in the region of the transfer wheel 122, or to impact with pressurized gas such that adhering moisture cannot reach the region of the heating device 116.

The preforms 14 and/or the containers 12 are preferably handled using tongs and/or the outlet section 22 is handled, at least in areas, by clamping mandrels or dowels impinging from the interior or exterior. Such handling means are likewise well-known from the prior art.

Figure 2:
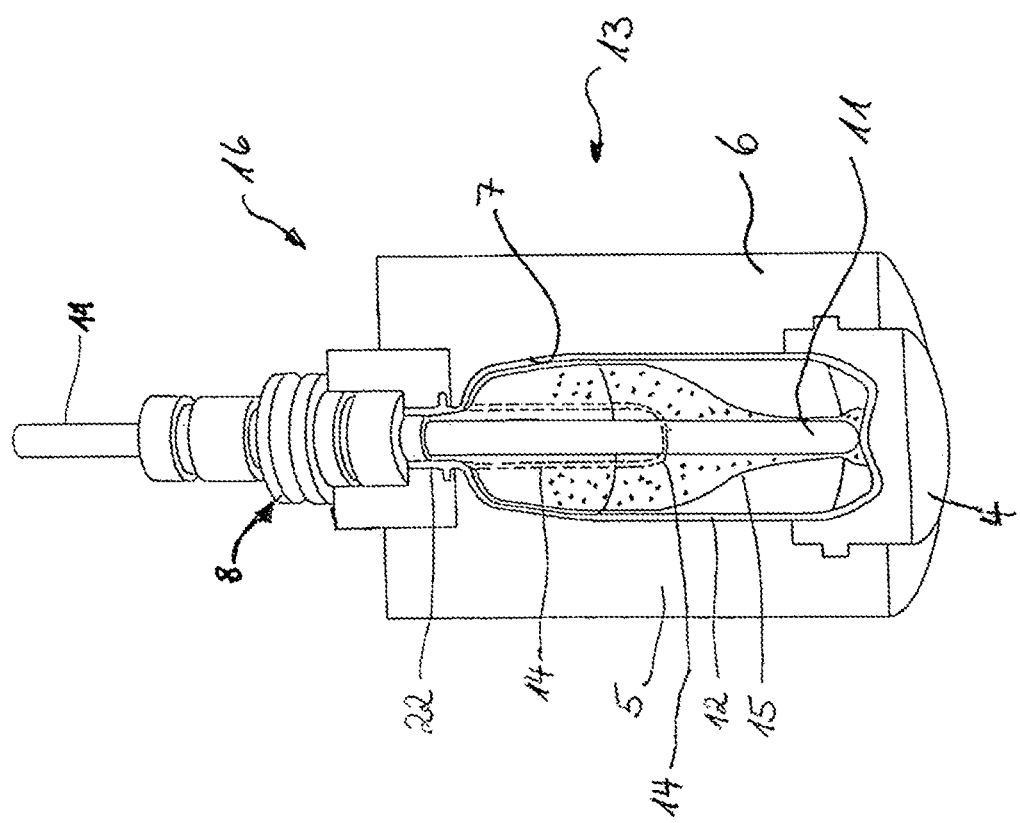
FIG. 2 a longitudinal section through a mold of a forming station, in which a preform is stretched and expanded, with a developing container bubble.

In a principally sectional view through a forming and filling station 16 in addition to the molded container 12, FIG. 2 also shows the preform 14 in dashes and a developing container bubble 15 schematically. In the exemplary embodiment shown, a stretching of the preform 14 in the longitudinal direction X thereof is provided by means of a stretching rod 11. In the process state shown of the forming and filling process, the mold 13 of the forming station 16 is in a closed state and the stretching rod 11 is moving until it reaches its lower end position. The stretching of the preform 14 in the axial direction X is complete, while the expansion transverse to the axial direction X is not yet complete in reference to the container bubble 15. The mold 13, which is formed from a mold base 4 and two halves of the mold sides, 5 and 6, encloses an inner cavity, which is terminated by the inner wall of the mold 7, against which the preform 14 and/or the developing container bubble 15 expands through the introduction of the content 3 under forming pressure. The pressurized feeding of the content 3 takes place by means of a forming and filling head 8, which has been lowered so as to seal the outlet section 22 of the preform 14 and by means of which the content 3 is introduced, e.g., through the stretching rod 11 and/or passed the stretching rod 11.

Figure 3A:
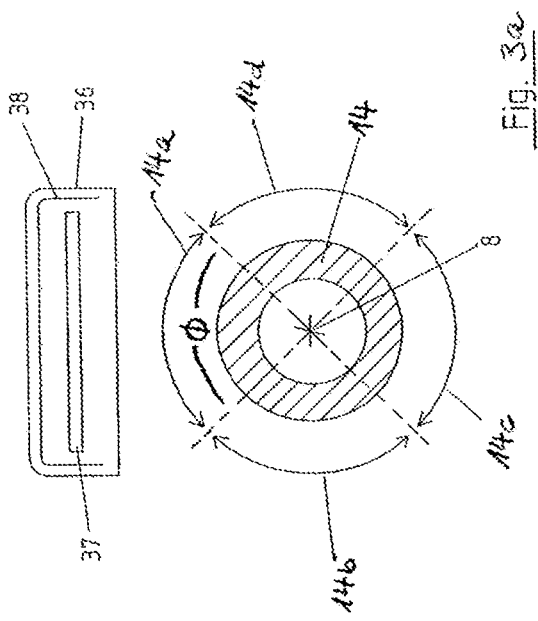
FIG. 3a a first exemplary embodiment of a temperature control device according to the invention.

FIG. 3a shows a horizontal section through a preform 14 arranged in the region of a temperature-profile-creation device 36. It can be seen that the temperature-profile-creation device 36 has a radiant heater 37, e.g. an IR or NIR radiator, as well as a reflector 38. In this embodiment, a circumference of the preform 14 has been divided into four angle ranges 14a, 14b, 14c, 14d. In the circumferential direction, the temperature control of the angle ranges 14a, 14b, 14c, 14d should take place such that one of these ranges is thermally differentiated, thus obtains, e.g., a higher temperature than the remaining ranges. In particular, it is provided that the radiant heater 37 directly radiates the preform 14 only in angle range 14a, while the remaining angle ranges 14b, 14c, 14d do not experience any direct heat radiation. Accordingly, angle range 14a with angle φ of the preform 14 is provided with a higher temperature than angle ranges 14b, 14c, 14d after impact with the heat radiation. The size of the respective angle ranges 14a, 14b, 14c, 14d is selected at 90° for each in the example shown and can also be selected to deviate therefrom.

When implementing the desired thermally differentiated circumferential region 14a of the preform 14, it would be possible to maintain the preform 14 in a non-rotatable manner. However, it is also possible to implement a rotation of the preform 14 about its longitudinal axis 8 with an incremental movement or continuously and, in doing so, to switch on or release the radiant heater 37 in cycles when the circumferential region 14a is aligned so as to face the radiant heater 37.

The temperature-profile-creation device 36 can be arranged, e.g., in the heating device 116, e.g. at the end of the heating zone, and resemble the heating mechanisms 118 provided in the heating device 116. For example, it is possible to adjust the temperature of the preform 14 in the circumferential direction uniformly initially in advance and subsequently to create the thermally differentiated region 14a with the help of the described temperature-profile-creation device 36, e.g., in that a preform 14 is guided passed a heating mechanism 118 in a non-rotatable manner.

Figure 3B:
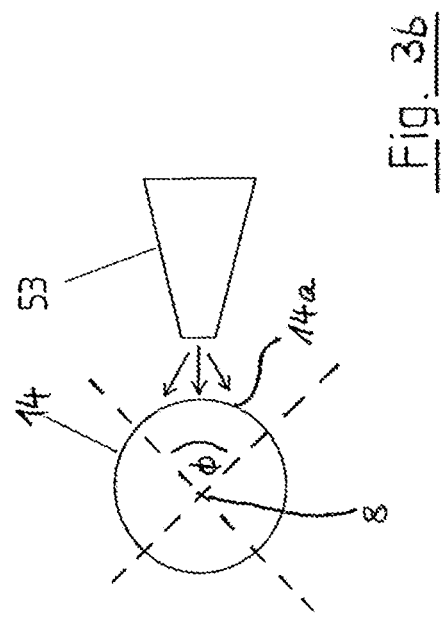
FIG. 3b a second exemplary embodiment of a temperature control device according to the invention.

FIG. 3b shows another option for thermal differentiation of a circumferential region 14a of a preform 14. A pre-tempered preform 14 in this case is moved along a cooling nozzle 53 in a non-rotatable manner, from which a cooling gas flows onto the circumferential region 14d. Air can be used for example. The statements related to FIG. 3a regarding rotation of the preform 14 and arrangement of the cooling nozzle 53 in the heating device 116 apply here in a similar manner.

It is also conceivable to provide both cooling of a first circumferential region, as explained by means of example in FIG. 3b, as well as heating of the circumferential region complementary thereto, as explained in FIG. 3a. It is also conceivable to replace the cooling nozzle 53 with a heating nozzle and to impact the angle range 14a with hot air.

Figure 4:
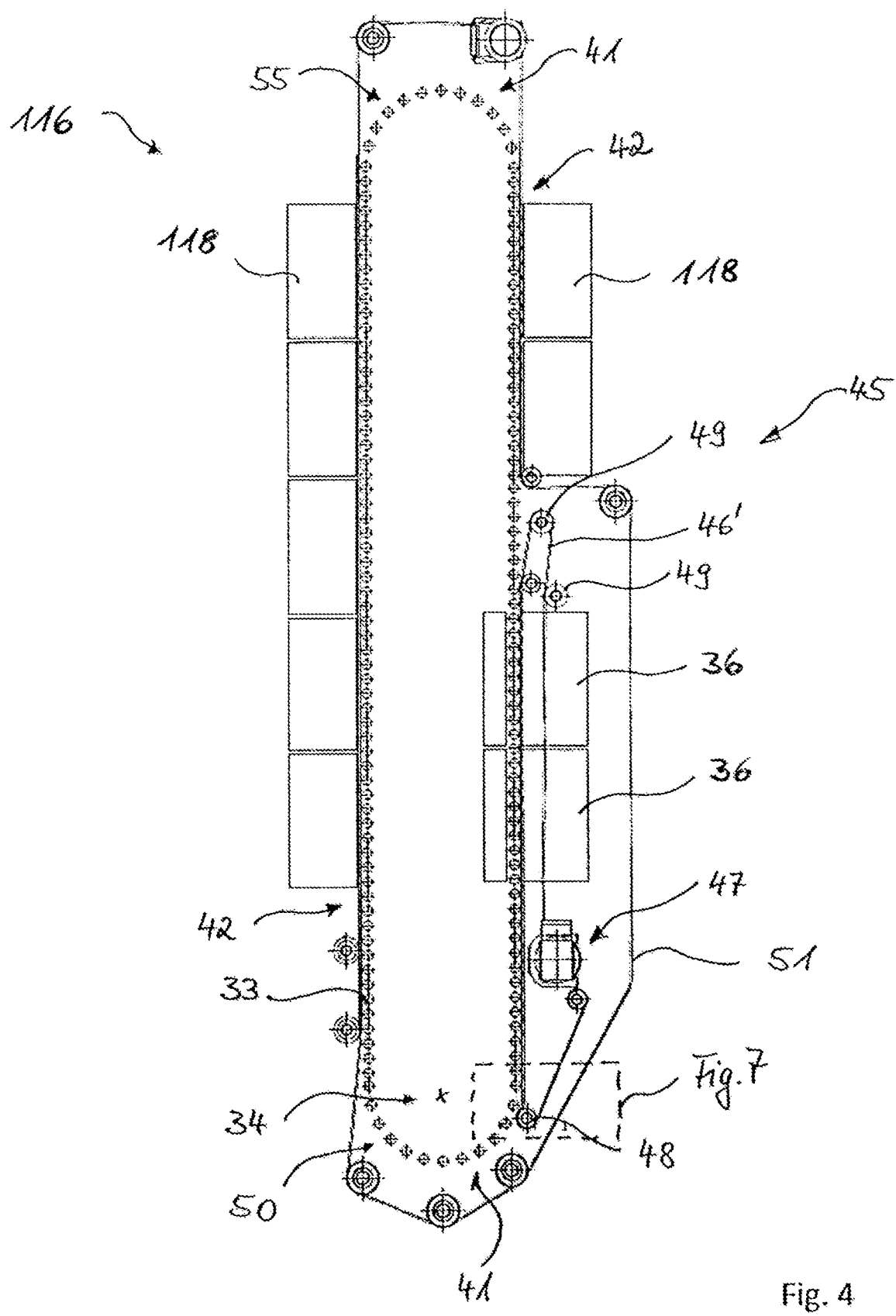
FIG. 4 a sketch related to a further exemplary embodiment of the present invention with a preform alignment device in a top view.

In a view from above, FIG. 4 shows a heating device 116 essentially known from the prior art with a temperature-profile-creation device 36 according to the invention for creating a thermally differentiated circumferential region 14a of a preform 14. The circulating transport chain 50, composed of multiple transport means 33, is indicated by individual chain links 33. This chain 50 is deflected via deflection wheels, which are not shown in greater detail, and has a curved region 41 in the area of this deflection and linear regions 42 lying in between. The preform is inserted into the heating device 116 in the region of the head wheel indicated by reference 34. FIG. 4 does not show the corresponding transfer wheels for transforming preforms to the heating device 116 and for removing the temperature-controlled preforms after passing completely through the heating device 116 by means of an almost complete circulation cycle of the transport chain 50.

Multiple heating mechanisms 118 are provided in the linear region 42 on the left in FIG. 4. Typical heating mechanisms 118 of this type are constructed, for example, as heater boxes with radiant heaters housed therein. Normally, multiple essentially horizontally extending linear-shaped heating pipes emitting heat radiation are arranged in this heating mechanism 118, with the heating pipes being arranged distributed about the length of the preform. These radiant heaters are normally arranged on one side of the heater box and a reflector is normally arranged on an opposite side of the heater box, the reflector being designed with high reflection capacity for the heat radiation used. The preforms 14 are guided through by the transport means 33 in the region formed between the radiant heaters and the reflector. In doing so, the preforms 14 are moved continuously and continuously rotated about their longitudinal axis in order to ensure the most uniform heating possible about the circumference of the preforms 14. Uniform temperature control can also take place in the axial direction of the preform 14. However, it is also possible for certain elevation regions of the preform 14 to be brought to a higher or a lower temperature than the other elevation regions. In the left-hand region, FIG. 4 shows five heater boxes 118 arranged next to one another, in which this uniform heating of the preforms 14 in the circumferential direction takes place, wherein this number can be selected as desired.

There are also heater boxes 118, 36 located on the opposite linear region 42 of the heating zone, through the heating device 116. The two heater boxes 118 the preforms 14 initially pass through on this section of the heating zone are structurally similar to the previously described heater boxes 118 for the uniform circumferential temperature control of the preforms 14. This is followed by a gap as well as two heater boxes 36 required for the thermal differentiation of a partial circumferential region 14a of the preforms 14 further in the direction of the preform movement, said boxes differing in their structure from the previously mentioned heater boxes 118. In this case as well, multiple radiant heaters are typically arranged on a first side of the heater box 36. However, there is optionally no reflector arranged on the opposite side of the heater box 36. This is intended to ensure that the preforms 14 guided through these thermal differentiation heater boxes 36 are not temperature-adjusted equally on the two opposite sides. This can also be achieved or further enhanced in that radiant heaters are used, which emit a radiation with a high portion of the radiation in a wavelength range which is absorbed by the preform material to a higher degree than with the heater boxes 118 for the uniform circumferential temperature control. In this manner, a desired temperature profile can be created in the circumferential direction, namely a circumferential region with an excellent temperature, at present with a higher temperature, namely the circumferential region facing the radiant heaters. The remaining circumferential regions have a lower temperature, namely the circumferential regions of the preform 14 facing in the direction of movement and opposite the direction of movement and the circumferential region facing away from the radiant heater.

Figure 7:
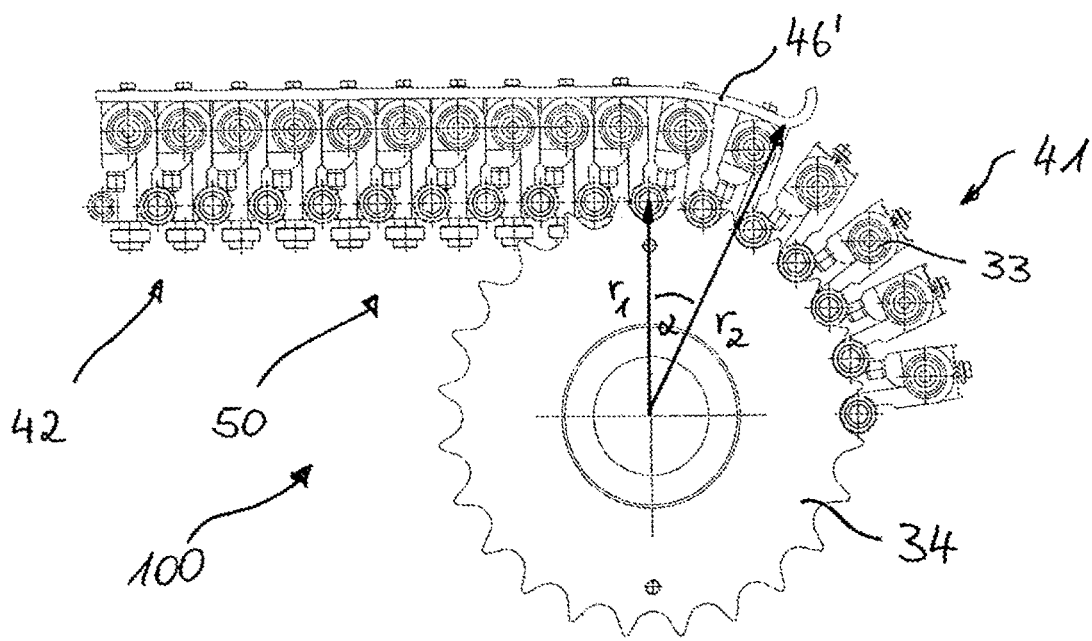
FIG. 7 a detailed view from FIG. 4 in the region of the head wheel for the alignment device therein.

FIG. 4 further shows the arrangement of an engagement mechanism 45, which, in the exemplary embodiment shown, is designed as a circumferentially guided engagement belt 46'. The upper deflection region 49 of the engagement belt 46' is located between the heating boxes 118 for the uniform circumferential temperature control of the preforms 14 and those heating boxes 36 for the thermal differentiation of a circumferential region. To this end, one feed-in position, for example, is unoccupied for a heater box. The lower deflection roller 48 for the engagement belt 46' is arranged in the region of the head wheel 34. In particular, this deflection roller 48 is designed such that the engagement belt 46' partially follows the curved region 41 around the head wheel 34. Furthermore, this deflection roller 48 is particularly formed so as to shift in a manner such that the engagement belt 46' follows the curved region 41 of the head wheel over a changing course. Details regarding this are shown in FIG. 7 and explained in greater detail in conjunction with FIG. 7, particularly the advantages thereby achieved.

The engagement belt 46' has a belt drive 47 in the exemplary embodiment shown. The engagement belt 46' is designed in this case such that an engagement in the transport means 33 takes place such that there is no rotation about the longitudinal axis of the preforms when passing through the heater boxes 36 designed for thermal differentiation. To this end, it is provided, for example, that the engagement belt 46' runs at the same speed as the transport chain 50. It is possible, for example, for a synchronization to take place between the transport chain 50 and the engagement belt 46'. It would also be conceivable, however, for the engagement belt 46', for example, to not have its own drive but rather, for example, carriers, which engage the transport chain 50 and are then carried along by the transport chain 50. In this manner, the speed of the transport chain 50 and of the engagement belt 46' can be evenly maintained in a simple manner.

FIG. 4 further shows a so-called mandrel rotary belt 51, which ensures the uniform rotation of the preforms 14 about their longitudinal axis when passing through the heater boxes 118 for uniform circumferential temperature control. This mandrel rotary belt 51 is guided by the transport chain 50 externally; in alternative embodiment variations, it could also be guided internally, and extends, at a slight distance, into the linear regions 42 of the heating device 116, parallel to the transport chain 50. This mandrel rotary belt 51 extends completely around the transport chain 50 and is a first engagement mechanism. Such a mandrel rotary belt 51 is already known in the prior art and interacts, for example, with a gear wheel 52, which is arranged at the respective transport means 33 and rolls off the mandrel rotary belt 51. The circumferential speed of the mandrel rotary belt 51 is selected in a ratio to the circumferential speed of the transport chain 50 such that a relative speed exists so that the transport means 33 bearing the preform 14 is placed into rotation about its own axis due to the unwinding of the gear wheel 52 on the mandrel rotary belt 51.

In the region between the heater boxes 118 for the uniform circumferential temperature control and the heater boxes 36 for the thermal differentiation of a circumferential region, this mandrel rotary belt 51 is guided away from the transport chain 50 and the mandrel rotary belt 51 is thereby out of engagement with the gear wheels 52 of the transport means 33. This guiding away is provided so that the second engagement mechanism 45 can engage the gear wheel 52 without the mandrel rotary belt 51 showing a fault. To this end, the mandrel rotary belt 51 is guided externally at the second engagement mechanism 45 and at its deflection and guide rollers 48, 49. Outside of the region of the heater boxes 36 for the thermal differentiation of a circumferential region and after the engagement belt 46' is returned for a complete circulation, the mandrel rotary belt 51 again extends close to the transport chain 50 and again engages with the gear wheels 52 of the transport means 33 formed, e.g. as transport mandrels, in the left linear region 42 of the heating device 116.

The enlarged cutout from FIG. 4 shown in FIG. 7 shows the engagement belt 46' in its extension in the region of the head wheel 34. In the left linear region, the engagement belt 46', e.g. a toothed belt, engages with the gear wheel 52 of the transport mandrels of the transport chain 50, wherein other transport means 33 could also form the chain links of the transport chain 50 as transport mandrels. This engagement is continued in a curved region 41 of the transport chain 50, and the engagement belt 46' extends over a partial circumference at a corresponding angle a in this curved region around the head wheel 34, before the belt 46' lifts off of the gear wheels 52 and starts its return. In the linear region 42, the engagement belt 46' and the transport chain 50 are at the same speed and, due to the parallel arrangement of the two belt and/or chain extensions, the preform 14 can be maintained in this manner in a fixed circumferential angle position. However, as soon as the curved region 41 starts, the transport chain 50 spreads and the engagement belt 46' and the transport chain 50 run at a different angular velocity on different radii r1, r2. For this reason, a rotation of the transport means 33 and of the preform 14 being thereby retained takes place in this curved region 41 of the head wheel 34. The angle of rotation is dependent, on one hand, on the ratio of the rotation radii of the transport chain 50 and of the engagement belt 46' and, on the other hand, on the angle a. Due to movement of the respective position in the curved region 41, at which the engagement belt 46' is placed out of engagement with the gear wheel 52 of the transport mandrel 33, the rotation of the preform 14 and/or of the transport mandrel 33 can be adjusted specifically. For the purposes of this adjustment, a deflection means 48 of the engagement belt 46' is implemented in this region 41 in an adjustable manner in order to specifically modify the angle shown in FIG. 7. The targeted rotation of the preform 14 and/or of the transport mandrel 33 is desired so that the preform 14 is inserted into the forming station 16 at a certain alignment so that, thus, the thermally differentiated circumferential region of the preform 14 is at a certain orientation, for example, upon the transfer to the working wheel 110 and into the molds of the forming stations, e.g. so that the differentiated circumferential region is lying outward radially or inward radially. The previously described design is an example of a preform alignment device according to the invention. The adjustment of such a desired alignment of the preform 14 is supported by the targeted adjustment of the angle a in FIG. 7 by means of shifting of a deflection roller 48 of the engagement belt 46.

The engagement belt described in reference to FIGS. 4 and 7 could also be designed, e.g., as an engagement chain. This chain would only have to be guided similarly to the engagement belt and engage the engagement body and/or the gear wheel 52. Other engagement mechanisms with the same functionality are also possible.

An example of an engagement chain, which has a significantly more complex structure in comparison to the previously mentioned engagement chain according to the exemplary embodiment in FIGS. 4 and 7 and which optionally provides further functionalities, is explained in the following, wherein, in a further variation from the previous exemplary embodiment, it does not have its own belt/chain drive and/or generally does not have its own drive for the engagement mechanism but rather the following exemplary embodiment provides for carrying of the engagement mechanism by means of the conveyor chain. This should also be considered an option which can be implemented in the previous exemplary embodiment. Vice versa, a separate drive can be provided for the engagement mechanism instead of a carrier and/or instead of a carrying engagement in the conveyor chain in any of the exemplary embodiments.

FIG. 5 shows a partial cutout and a perspective side view of a second example of a second engagement mechanism 45'. This second engagement mechanism 45' is substantially designed as a circulating chain with multiple chain links. The first engagement mechanism 51 is also formed here in the form of a circulating toothed belt, namely as a mandrel rotary belt. In the front right-hand region of FIG. 5, a heater box 118 is shown, which is provided for the uniform temperature control of a preform 14 in the circumferential direction. Two heater boxes 36 are shown in the left region of FIG. 5, which are formed for the thermal differentiation of a circumferential region of a preform 14. In the region in between, which remains free due to the omission, for example, of a heater box, the second engagement mechanism 45' is arranged. This engagement mechanism 45' consists of an upper component 53 and a lower component 54. The mandrel rotary belt 51 is guided away from the transport chain 50 between these components 53, 54 and extends on the exterior along the heater boxes 36. This selected division of the engagement mechanism into two sections is purely optional and enables, e.g., the provision of further functions in this region of the heating device 116. Such further functions may be, e.g., the implementation of sterilization by means of a sterilization mechanism or, e.g., the provision of an inspection device. With respect to the sterilization mechanism, reference is made, e.g., to DE 10 2010 026 166 A1 and particularly here to FIG. 5 as well as to the statements therein regarding the advantages and regarding the technical implementation of the sterilization of preforms in the region of the heating zone of a heating device.

Figure 6A:
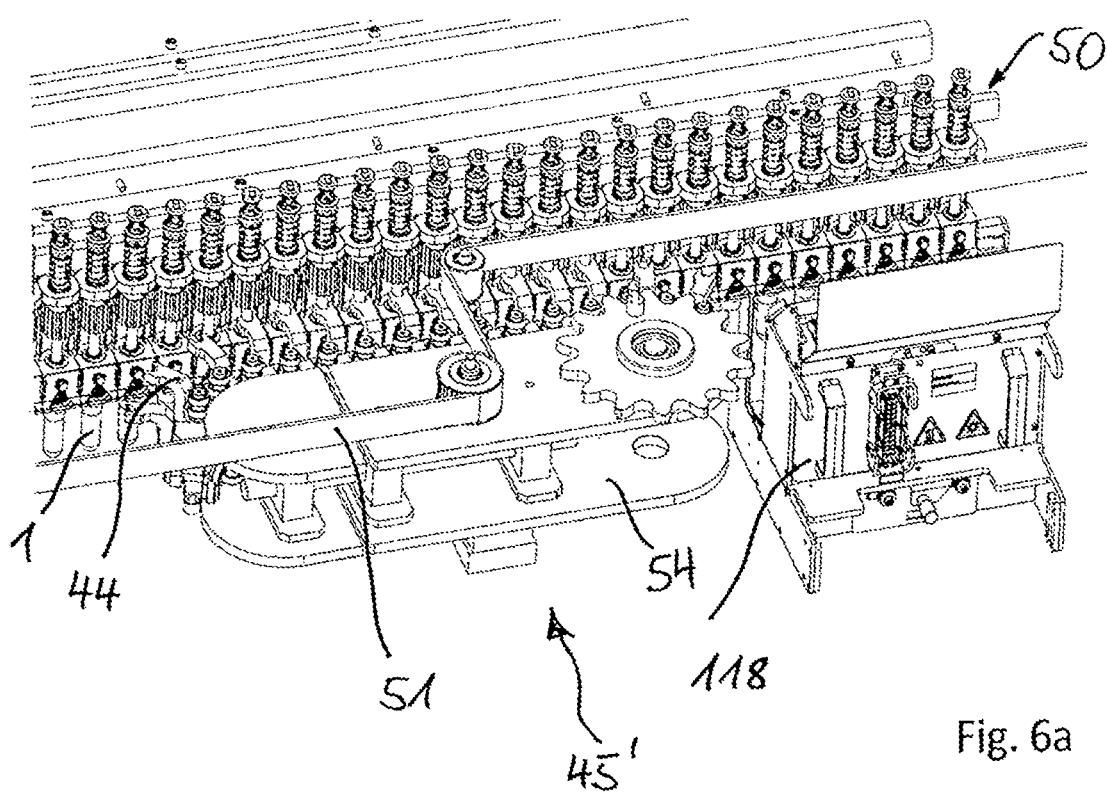
FIGS. 6a, 6b enlarged views of the exemplary embodiment in FIG. 5 in the region of the alignment device for the preforms.
Figure 6B:
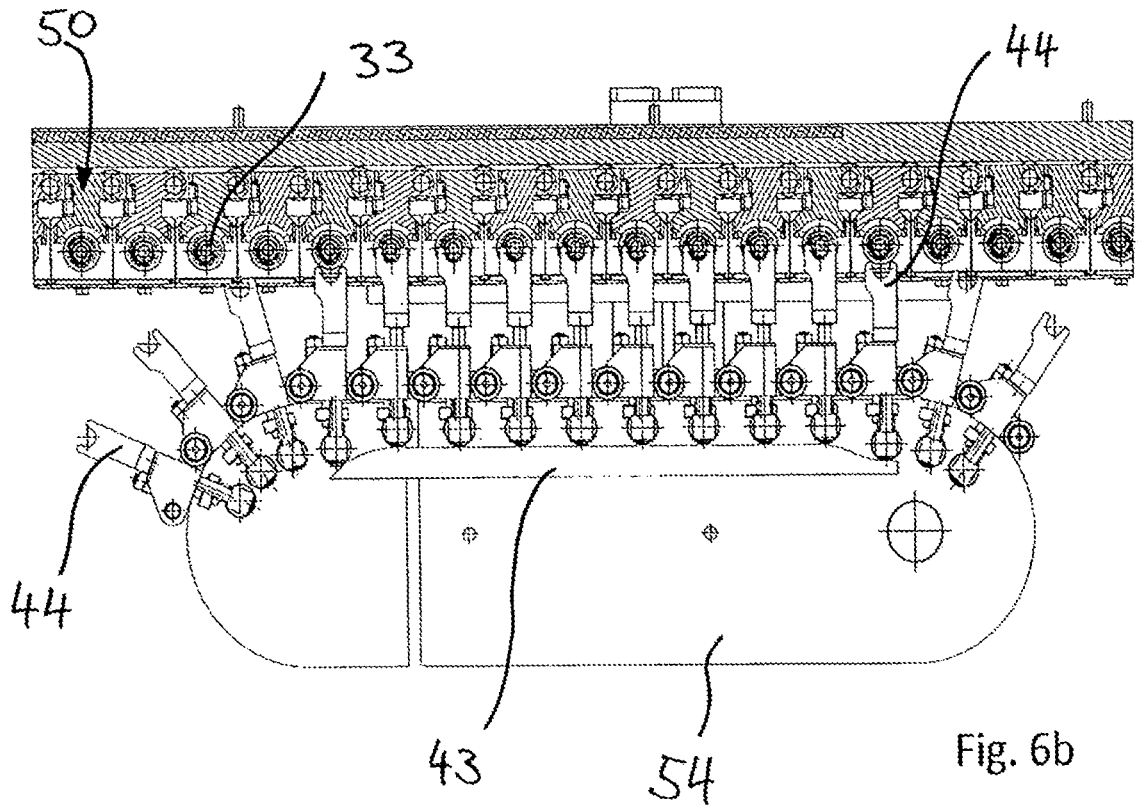

The upper component 53 and the lower component 54 of the second engagement mechanism 45' are linked to a coordinated rotational movement, which is not shown. It is also conceivable here to provide both components 53, 54 with their own drives, which function in a manner coordinated with one another, in order to achieve a uniform and synchronized rotational movement. However, it is also conceivable for only one of the two components 53, 54 to have a drive and, for example, the other component to be driven by means of a coupling motion. However, it is also possible for one or both components to engage the transport chain 50 by means of carriers and be carried along by the transport chain 50. This is shown in FIGS. 6*a* and 6*b* by means of example. This embodiment variant has the advantage that the individual chain links of the engagement chain 45' automatically run at the same speed as the links of the transport chain. Upon engagement of the engagement elements 45' with the gear wheel 52 of the transport mandrel 33 and upon the indicated same speed of the engagement mechanism 45' and of the transport mandrel 33, this means that the inherent rotation of the preform 14 about its longitudinal axis is suppressed. Accordingly, the preform 14 can be guided with a fixed orientation in the circumferential direction by means of the heater box 36 formed for the thermal differentiation of a circumferential region. Because the mandrel rotary belt 51 is guided out of engagement with the transport mandrel 33 in the region of the second engagement mechanism 45', it is sufficient to end and to stop the mandrel rotation in this region.

Essentially, it may be provided, e.g., that the carrier 44 has an engagement element, e.g. a blocking element, which engages the rotary drive body 52 of the transport mandrel 33 in a manner to prevent a rotation, as soon as the carrier 44 is placed in carrying engagement with the transport chain 50 in a cam-controlled manner. The blocking elements would then be moved with the carriers and, e.g., simultaneously placed in engagement and out of engagement. To this end however, the lift-off of the mandrel rotary belt 51 shown in FIG. 6*a* must take place, e.g., earlier than as shown there. It is also possible for an engagement element of the engagement mechanism 45' to be arranged on each chain link, separate from the carrier 44 but in a similar manner to the carrier 44, with the engagement element likewise being placed in engagement and out of engagement, in a cam-controlled manner, with the rotary drive body 52 of the transport mandrel 33. This can take place at a different time than the carrier engagement with the conveyor chain 50. This would also make it possible to select the number of carriers 44 to be different than the number of engagement elements. It is not necessary for each chain link to have a carrier; this is purely optional. It is only necessary that a sufficient number of carriers be arranged distributed over the chain length in order to ensure continuous carriage. To this end however, 3 or 4 uniformly distributed carriers would be sufficient.

FIGS. 6*a* and 6*b* show how the carriers 44 discussed in the previous paragraph can be formed in a special embodiment, with omission of the upper component. The lower chain unit 54 has carriers 44 that can be moved in the radial direction, which are held, e.g., spring-loaded in a position pulled radially inward. Upon reaching an external control curve 43, the carriers 44 are pressed radially outward and reach traction engagement with the transport means 33 of the transport chain. Such a solution is considered to be advantageous, because the carriers 44 cannot simply swivel into the linearly moved transport chain 50. The engagement of the carriers 44 can take place, e.g., only in the linear circumferential region 42.

Figure 8:
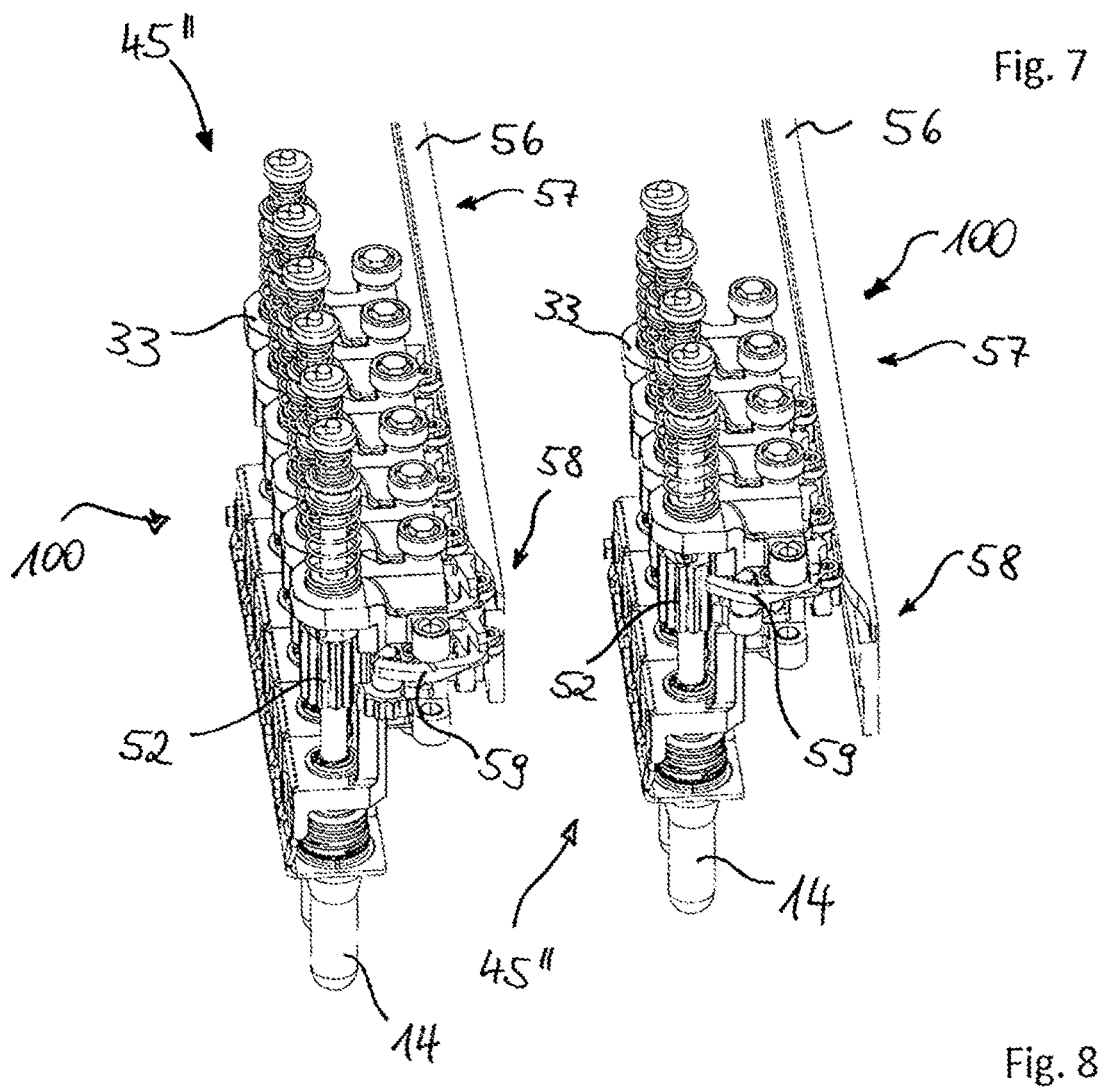
FIG. 8 perspective views of the details from FIG. 7.
Figure 9:
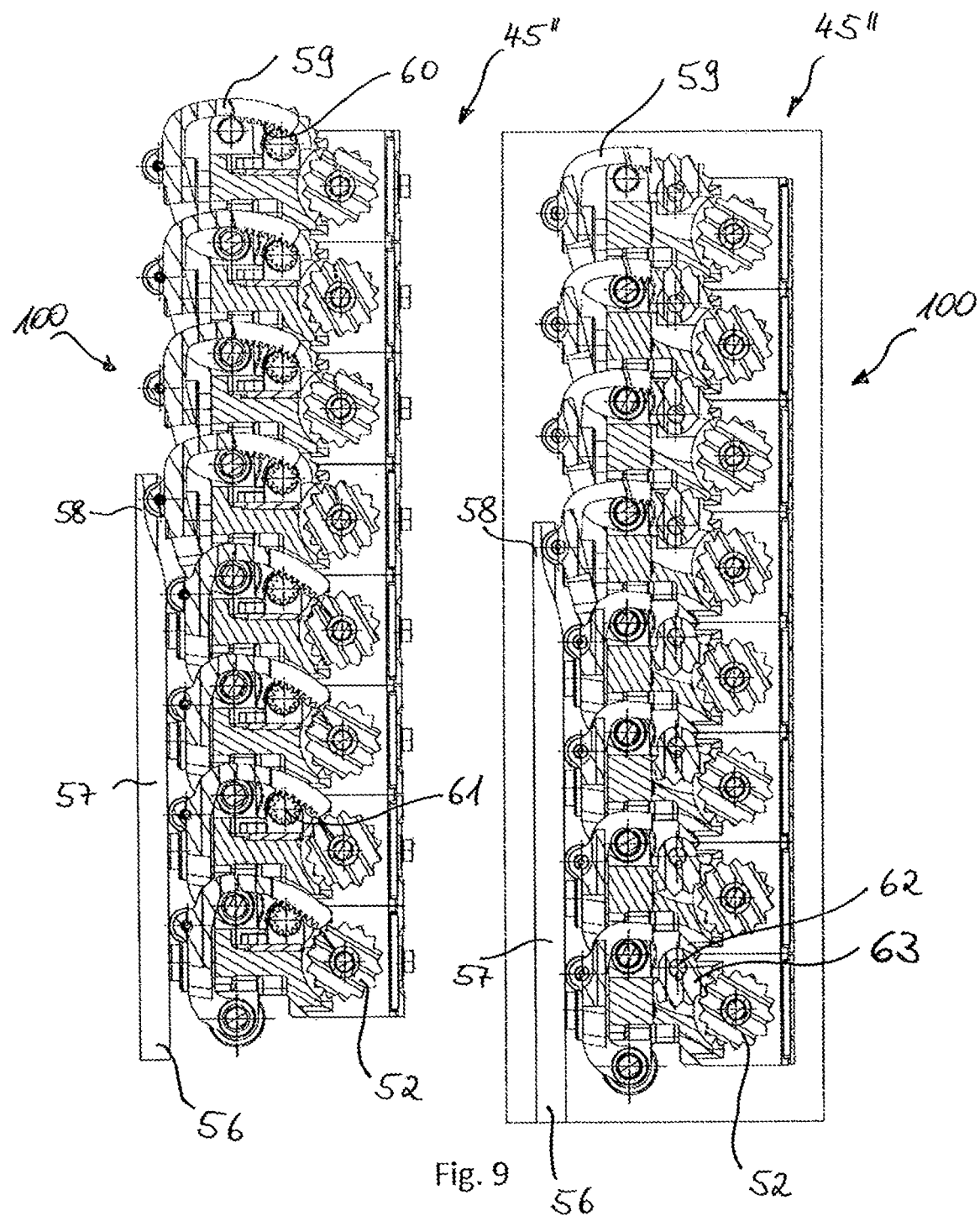
FIG. 9 sectional views from above of the subject matter in the left half of the picture from FIG. 8.

FIG. 8 shows a further detail of a second engagement mechanism 45". This engagement mechanism 45" consists of multiple engagement elements 63, which are formed by an external control curve 56 in a cam-controlled manner. In a first region 57 of this control curve 56, the engagement elements 63 are out of engagement with the gear wheel 52 of the transport mandrel 33. In a second region 58 of the control curve 56, a swivel lever 59 is actuated, which has inner toothing 60 and which drives a pinion 61. The details regarding this are more easily seen in FIG. 9. In particular, it can be seen that this pinion 61 sits on a common shaft 62 with a belt pulley segment 63. The swivel movement of the swivel lever 59 leads to a rotation of the pinion 61. The rotation of the pinion 61 is matched by the belt pulley segment 63. In the first region 57 of the control curve 56, this belt pulley segment 63 is out of engagement with the gear wheel 52 of the transport mandrel 33. In the second region 58 of the control curve 56, the swivel lever 59 swivels, the pinion 61 thereby rotates, and the belt pulley segment 63 thereby reaches engagement with the gear wheel 52 of the transport mandrel 33. Retaining this position means that the gear wheel 52 is held, and the transport mandrel 33 and the preform 14 being held thereby are maintained in a non-rotatable manner.

This design further enables the transport mandrel 33 and the preform 14 being held thereby to be maintained not only in a non-rotatable manner but specifically to twist about a certain angle of rotation, namely when the swivel movement of the swivel lever 59 is designed such that the belt pulley segment 63 not only holds the gear wheel 52 in a certain position but rather the swivel lever 59 could be more strongly swiveled, for example, in a third region of the control curve 56 in that the pinion 61 thereby rotates even further and the belt pulley segment 63 thereby rotates even further such that, as a result of the comb-like engagement with the gear wheel 52 of the transport mandrel 33, this gear wheel 52 and thus also the transport mandrel 33 is twisted about a certain angle. This can be used, e.g., as a preform alignment device, because the preform 14 should be inserted into the forming station 16 in a certain alignment and must possibly have to be rotated specifically for this.

A plurality of further suitable alignment devices for preforms are known in the prior art, e.g., devices interacting with alignment structures on the preform or with optical markings on the preform. WO 2016/180510 A1 shows examples and mentions examples in the prior art, which are essentially suitable also as preform alignment devices for the present invention in order to align the thermally differentiated circumferential region of the preform in the desired manner for transfer to the forming stations. Reference is explicitly made with regard to this to the content of WO 2016/180510 A1 and to the content of the documents mentioned therein as the prior art.

What is claimed is:

1. A method for producing a container filled with a liquid from a preform made of a thermoplastic material, said method comprising steps of:

transporting the preform through a heating zone of a heating device to thermally condition the preform;

inserting the thermally conditioned preform into a mold of a forming station arranged on a continuously rotationally driven working wheel having a rotational axis; and feeding the liquid into the preform inserted into the mold as a pressure medium using a forming and filling head of the forming station to simultaneously form the preform into the container and fill the container with the liquid;

wherein formation of the container takes place against an inner wall of the mold with the mold being closed, wherein, prior to the inserting step, a temperature profile is imparted in the preform by a compensating device to compensate for thermal consequences of centrifugal force acting on the liquid fed into the preform during the feeding step, wherein the temperature profile imparted in the preform by the compensating device to compensate for the thermal consequences of centrifugal force acting on the liquid fed into the preform during the feeding step is independent of any other temperature profile that may be imparted in the preform based on a symmetry of the container to be formed in the mold, wherein the compensating device is configured to impart the temperature profile in the preform to compensate for thermal consequences of centrifugal force acting on the liquid content fed into the preform during the feeding step in a circumferential direction, which is not point-symmetrical in relation to a longitudinal axis of the preform to produce a thermally differentiated partial circumferential region in the preform, and wherein the inserting step includes aligning the preform using a preform alignment device such that the preform is inserted into the mold with the thermally differentiated partial circumferential region being farthest away from the rotational axis of the working wheel in a radial direction of the working wheel.

2. The method according to claim 1, wherein, during the feeding step, the preform is guided and stretched in a direction of its longitudinal axis at least for a time by a stretching rod.

3. The method according to claim 1, wherein the thermally differentiated partial circumferential region is heated more strongly than remaining circumferential regions of the preform.

4. The method according to claim 1, wherein the temperature profile imparted to the preform in the thermally differentiated partial circumferential region is selected based at least in part on the circumferential rotation speed of the working wheel.

5. The method according to claim 1, wherein the compensating device is arranged in the heating zone of the heating device.

6. The method according to claim 1, wherein the forming station is one of a plurality of forming stations provided on the working wheel, and wherein the preform is one of a plurality of preforms that are sequentially formed into containers and filled with the liquid.

7. The method according to claim 1, wherein the container is rotationally symmetrical about its longitudinal axis, is formed with n-fold symmetrical rotation, and wherein n is greater than 4.

8. The method according to claim 7, wherein n is greater than 8, and wherein the container is substantially circularly symmetrical.

9. The method according to claim 1, wherein the thermally differentiated partial circumferential region has a partial circumferential angle $\phi$ of less than 180°.

10. The method according to claim 9, wherein the partial circumferential angle $\phi$ is less than 90°.

\* \* \* \* \*